United States Patent
Dusenberry et al.

(10) Patent No.: US 7,209,049 B2
(45) Date of Patent: Apr. 24, 2007

(54) DISTRIBUTED METER READING TERMINAL

(75) Inventors: Robert Dusenberry, Newman Lake, WA (US); Barry Cahill-O'Brien, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 11/063,648

(22) Filed: Feb. 22, 2005

(65) Prior Publication Data
US 2005/0184881 A1 Aug. 25, 2005

Related U.S. Application Data

(60) Provisional application No. 60/545,877, filed on Feb. 19, 2004.

(51) Int. Cl.
*G08B 23/00* (2006.01)

(52) U.S. Cl. .............................. 340/870.02; 340/870.11; 370/338

(58) Field of Classification Search ........... 340/870.02, 340/870.11; 370/338; 455/11.1
See application file for complete search history.

(56) References Cited

U.S. PATENT DOCUMENTS 5,270,704 A * 12/1993 Sosa Quintana et al. ..................... 340/870.02
5,726,646 A * 3/1998 Bane et al. ............. 340/870.03
6,252,883 B1 * 6/2001 Schweickart et al. ........ 370/441
6,300,881 B1 * 10/2001 Yee et al. ............... 340/870.02
6,885,309 B1 * 4/2005 Van Heteren ........... 340/870.11
6,985,087 B2 * 1/2006 Soliman ................. 340/870.02
2003/0193405 A1* 10/2003 Hunt et al. ............. 340/870.02

* cited by examiner

*Primary Examiner*—Timothy Edwards, Jr.
(74) *Attorney, Agent, or Firm*—Perkins Coie LLP

(57) ABSTRACT

A distributed meter reading terminal provides meter communication capabilities. For example, an operator may approach one or more meters with a portable first portion of a distributed meter reading apparatus. Communication is established between the first portion of the distributed meter reading apparatus and the one or more meters so that data can be collected from the one or more meters. Communication is then established between the first portion of the distributed meter reading apparatus and a second portion of the distributed meter reading apparatus, which may also be portable and which may include processing capabilities that allow for the management of collected data. The collected data is then transferred from the first portion to the second portion of the distributed meter reading apparatus. The first portion of the distributed meter reading apparatus and the second portion of the distributed meter reading apparatus may otherwise operate independently.

23 Claims, 7 Drawing Sheets

DISTRIBUTED METER READING TERMINAL

CROSS-REFERENCE TO RELATED APPLICATION

This application claims the benefit of commonly owned U.S. Provisional Patent Application No. 60/545,877, filed Feb. 19, 2004, which is herein incorporated by reference.

BACKGROUND

A typical utility provider (e.g., gas utility, water utility, electrical utility, etc.) may manage multiple meters that provide information about utility usage by its customers. Management of utility meters may include tasks such as periodic meter reading and meter servicing. For example, a utility may schedule a set of meters on a particular geographic route for reading or servicing on a monthly basis, on an annual basis, or as otherwise needed.

To facilitate meter reading and servicing, utility providers may implement a variety of meter management techniques, such as electronic meter reading (EMR), off-site meter reading (OMR), and automatic meter reading (AMR), some or all of which may include computerized or automated functionality. For example, operators for EMR systems use handheld computers with integrated meter reading software to capture and store meter data from electric, gas, or water meters. Typically, with EMR, an operator walks a specified route, visually reading meters and entering meter data into the handheld computer. The meter data is eventually transferred to a host processor, which then transfers the data to a utility billing system, etc. EMR systems can also incorporate readings gathered by probing meters, as is the case with time-of-use meters and interval data recorders. EMR systems can also probe water meters using inductive probes, etc.

OMR uses radio-equipped handheld computers to read module-equipped electric, gas, or water meters via radio. This enables a meter to be read without directly accessing the meter or the premise. With OMR, while an operator walks a route, the radio-equipped handheld computer sends a radio "wake-up" signal to nearby radio-based meter modules installed on electric, gas, or water meters. There are also bubble-up techniques where the radio-based meter modules send the information at some configurable time interval (e.g., every five seconds). The handheld computer then receives meter reading and tamper data back from the meter modules. OMR is normally used within a utility service territory to read meters that are otherwise hazardous or costly to read.

Mobile AMR is similar to OMR. A radio transceiver is installed in a utility vehicle and route information is specified. While being driven along the specified meter reading route, the transceiver broadcasts a radio wake-up signal to all radio-based meter modules within its range and receives messages in response. Like OMR, mobile AMR can also use bubble-up techniques in place of wake-up techniques for transmission of data. Mobile AMR is usually used in saturated areas where there may be difficult-to-access or hazardous-to-read meters or large populations.

Most meter management techniques, including those described above, rely on the use of specialized portable or handheld devices. While more generic personal portable computing devices (e.g., PCs, laptops) can be used in meter management applications, these devices have several disadvantages that make them undesirable in the meter management setting. For example, such devices can be expensive and may employ fast-changing technology, which makes them obsolete in a relatively short time. Given these factors and the large number of devices needed to service a typical area, the widespread use of such devices for meter management may be financially prohibitive. Moreover, generic personal portable computing devices incorporate technology that is typically not suitable for the harsh workplace of the meter management environment. In addition, their use may be limited because of the lack of specialized input features (e.g., sufficient keys, etc.). Such devices may also be unsuitable for wireless meter management applications because they are electrically noisy, causing them to interfere in the reading of meters. Likewise, such devices may fail to perform well in real time probing (e.g., optical probing) applications due to the nondeterministic nature of their operating systems.

Figure 1:
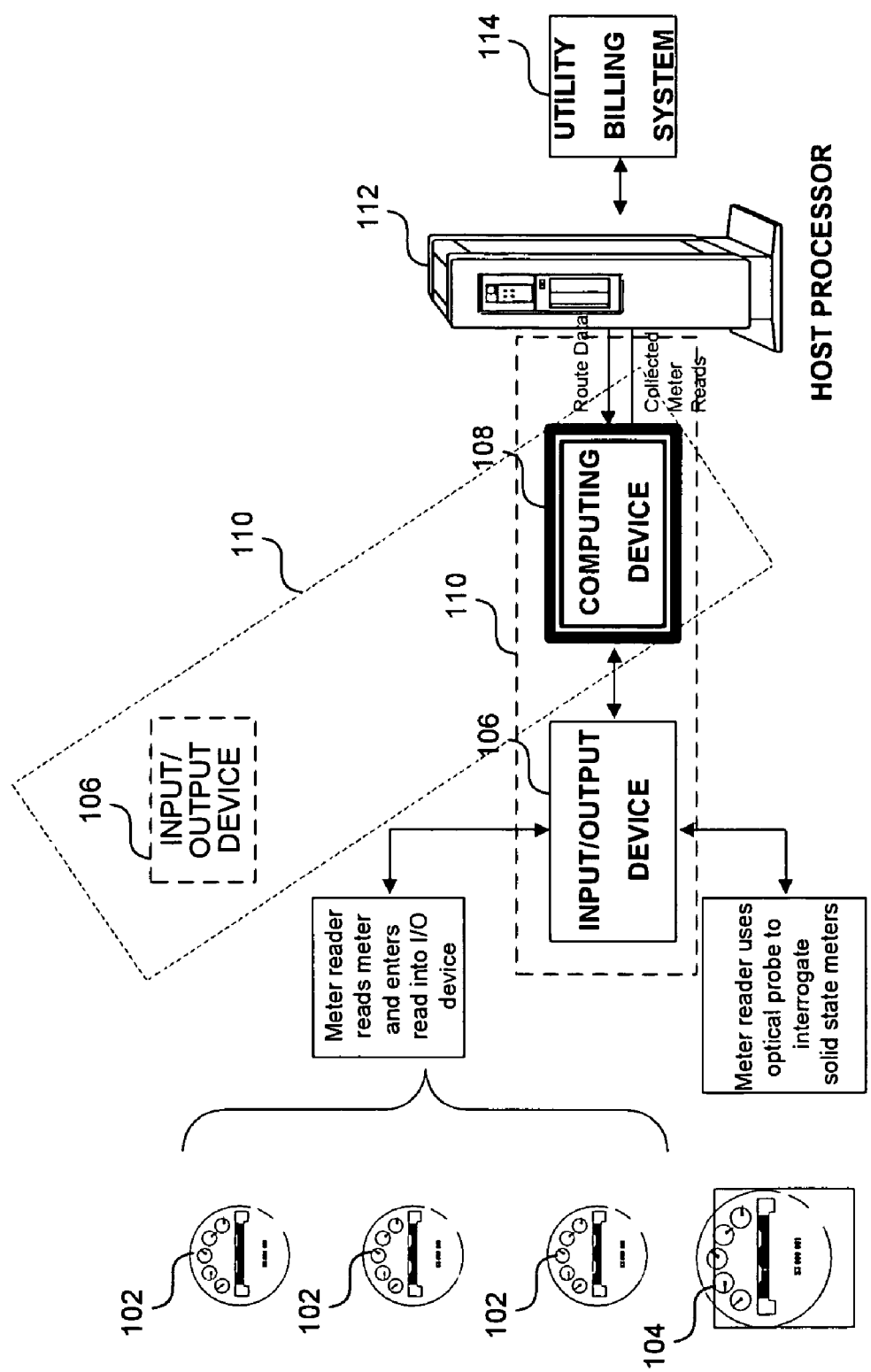
FIG. 1 is a block diagram showing a first example of a system on which the distributed meter reading technique can be implemented in one embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A technique for reading meters within a utility system (e.g., electric, gas, water utility) using distributed devices is described herein. By separating a portable computing device from an input/output device, a distributed meter reading device is created.

In some embodiments, the input/output device may contain a display, touch screen, keypad, meter reading radio, optical probing interface, and any other useful meter management technology. The input/output device may be configured and packaged to withstand the rigors of meter reading activities. The input/output device may also contain a gateway, such as a wireless gateway, to allow it to communicate with the portable computing device.

The portable computing device, which can be housed in a protective, electrically shielded case to prevent leakage of electrical noise, remotes at least a portion of its display, touchpad, and keypad to the input/output device. Accordingly, an application or operating system running on the portable computing device can interact with the input/output device as if the input/output device was running the program.

The distributed devices provide the input/output features associated with more specialized devices, but still allow the use of commercially available, off-the-shelf portable computers for most of the processing. As commercially available computing devices evolve, use of distributed devices allows the computing device to be replaced or updated without having to replace the input/output device. In effect, the cost to develop and replace such computing devices is minimized. This cost is further minimized in embodiments where the distributed functionality provides a many-to-one relationship between input/output devices and portable computing devices.

II. System Architecture

Figure 2A:
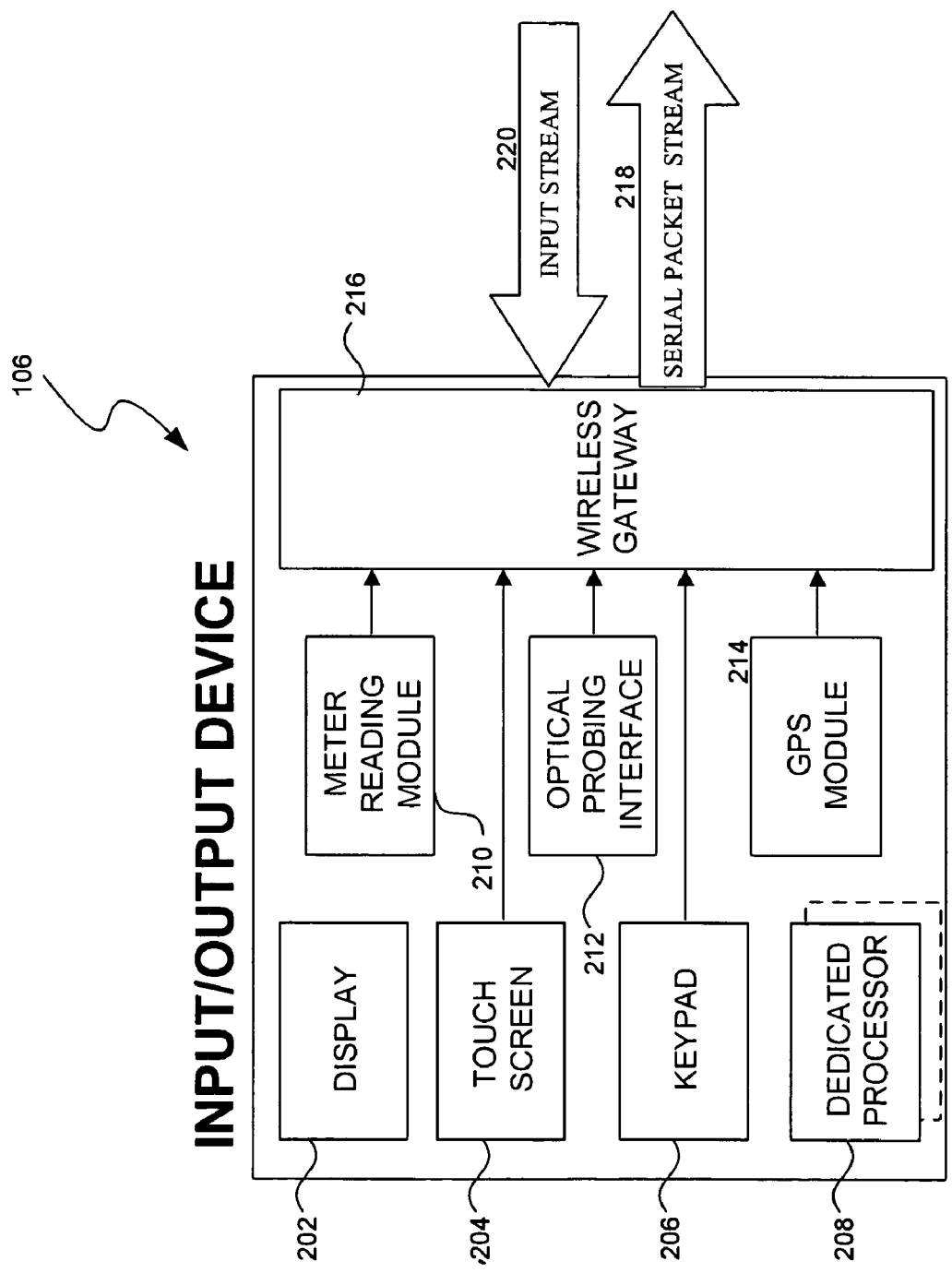
FIGS. 2A–2C are block diagrams showing more detailed views of the input/output device of the system of FIG. 1, and various example configurations of such a device.
Figure 2B:
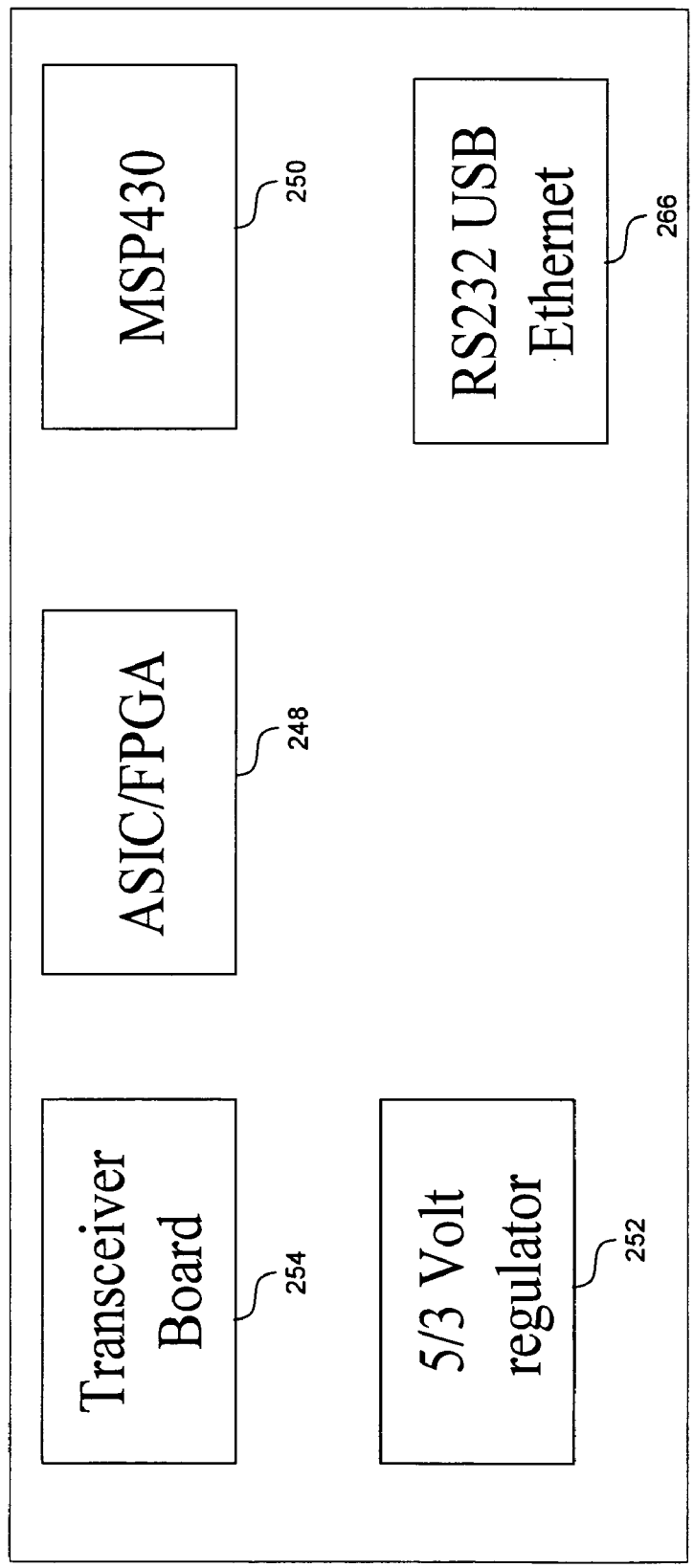
Figure 2C:
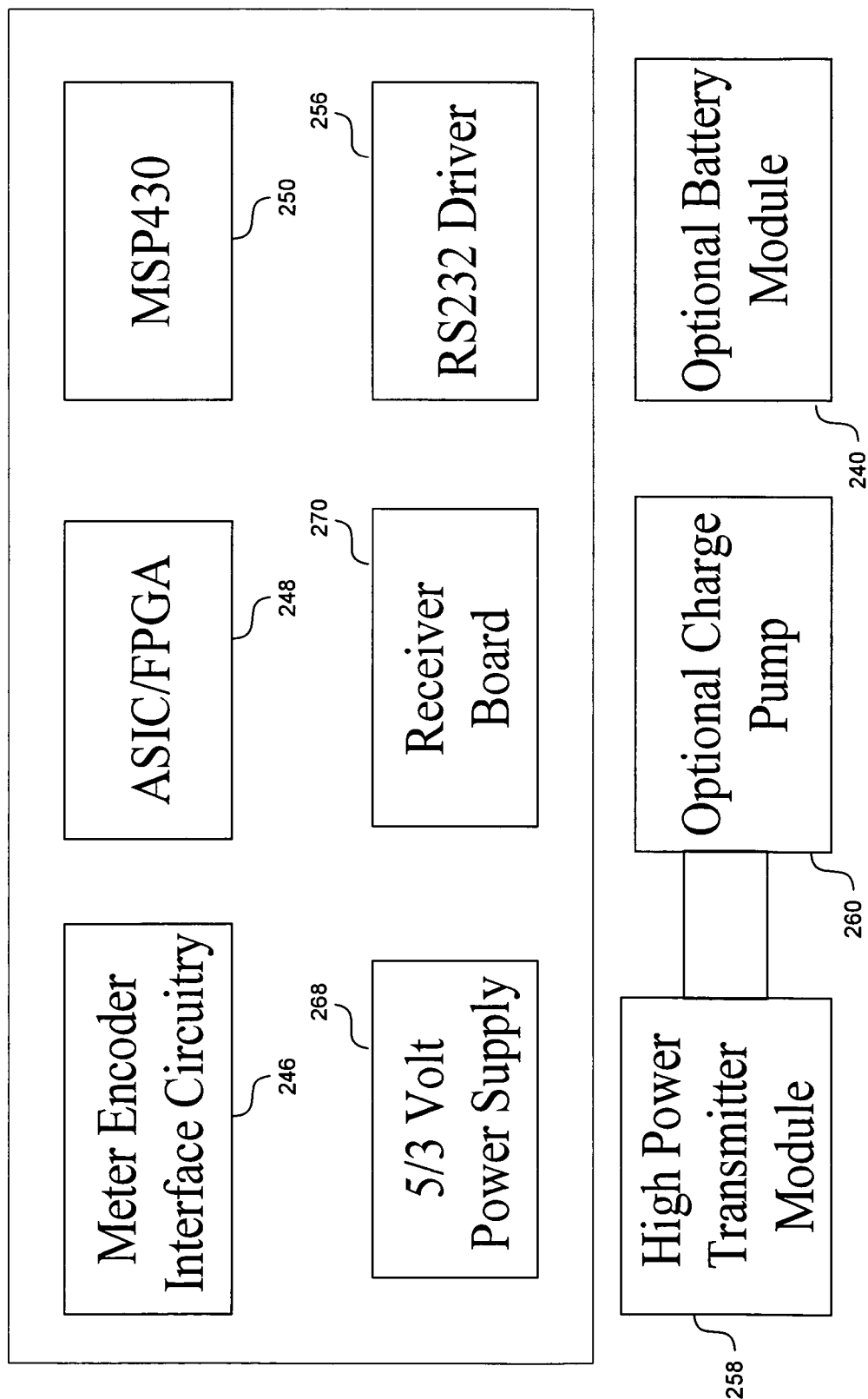
Figure 3:
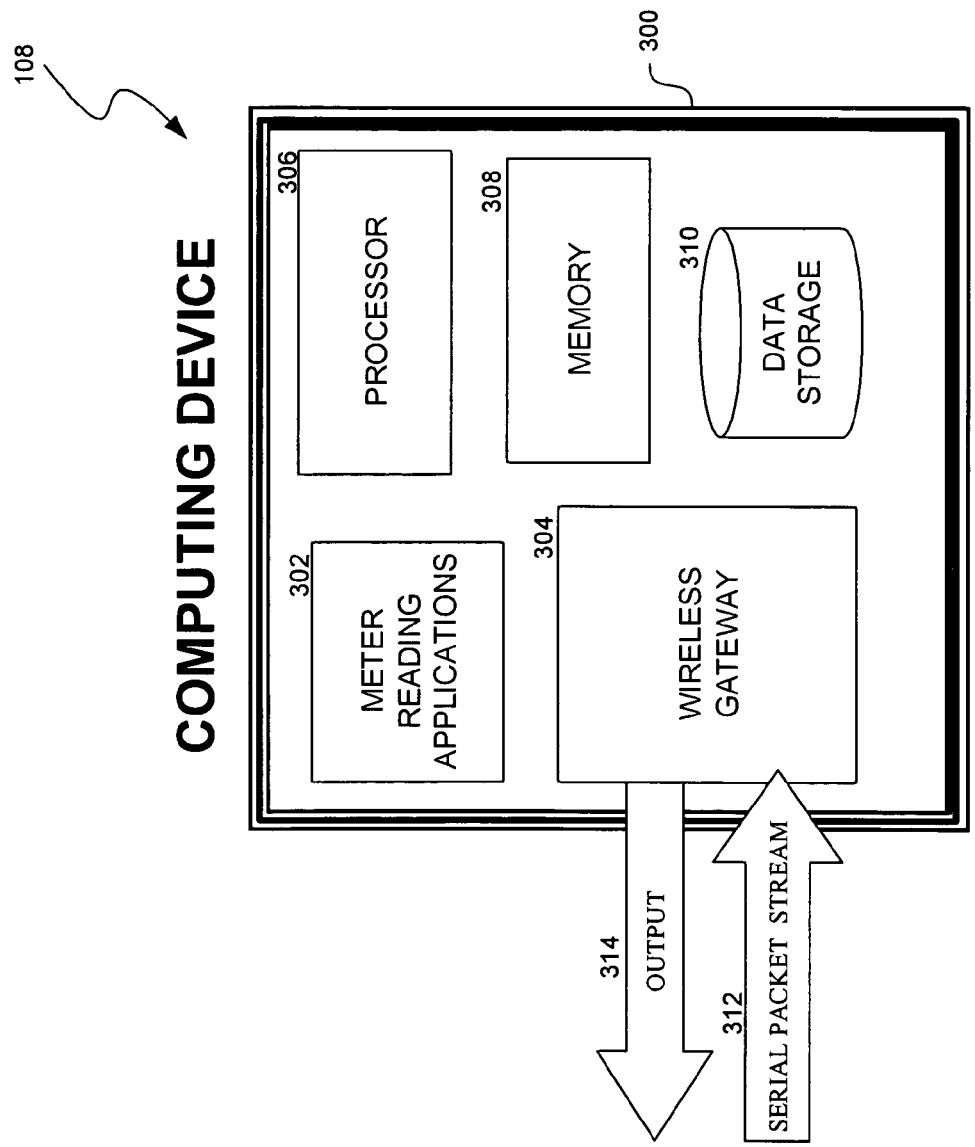
FIG. 3 is a block diagram showing a more detailed view of the computing device of the system of FIG. 1.

FIGS. 1–3 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that the invention can be practiced with other communications, data processing, or computer system configurations, including: Internet appliances, handheld devices (including personal digital assistants (PDAs)), wearable computers, all manner of cellular or mobile phones, multiprocessor systems, microprocessor-based or programmable consumer electronics, set-top boxes, network PCs, minicomputers, mainframe computers, and the like. Indeed, the terms "computer," "host" and "host computer" are generally used interchangeably, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention may be stored or distributed on computer-readable media, including magnetically or optically readable computer discs, as microcode on semiconductor memory, nanotechnology memory, or other portable data storage medium. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer such as a mobile device.

Referring to FIG. 1, a meter reading system, including a collection of meters (102 and 104), is shown. The meters (102 and 104) may be gas meters, electric meters, water meters, etc. The meters (102 and 104) can include standard meters 102 and/or solid state meters 104. The meters (102 and 104) may be read using a combination of one or more input/output devices 106 and a computing device 108, which collectively form one or more distributed meter reading terminals 110. Data collected using the one or more distributed meter reading terminals 110 can then be routed to a host processor 112. The combination input/output device 106 and computing device 108 may also receive geographic route data from the host processor 112. The meter reading system may also include a utility billing system 114.

Communication between the one or more input/output devices 106 and the computing device 108 forming one or more distributed meter reading terminals 110 may be by any wired or wireless means, including Bluetooth, IEEE 802.11, cell phone protocols, satellite transmission, infrared, etc. Likewise, the link between the computing device 108 and the meter reading host processor 112 can be through various means including direct download over a computer network or wireless network. The use of a local area network (LAN) may also be possible. In some embodiments, more than one distributed meter reading terminal may be implemented using a computing device 108 and input/output devices 106 in a one-to-many relationship.

Some of the functions performed by either the input/output device 106 or the computing device 108 can be implemented as an application specific integrated circuit (ASIC), by a digital signal processing (DSP) integrated circuit, through conventional programmed logic arrays or through circuit elements. While the embodiments described herein are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client. Like the input output device, the computing device may be easily portable (e.g., worn on a belt-clip or backpack).

Referring to FIG. 2A, the input/output device 106 of FIG. 1 is shown in more detail. The input/output device 106 may be carried by a meter reading operator and allows the operator to input information for meter reading (e.g., read commands) and view information resulting from meter reading applications. The input/output device 106 may have a rugged exterior designed for outdoor use in a variety of conditions (moisture, being dropped, extreme heat or cold, etc.) To protect it from noise, environmental contamination, and other interfering factors, the input/output device 106 may be surrounded by an electromagnetically shielded and environmentally sealed case or housing. The case or housing may be constructed from a strong metallic or plastic material, with electrically shielded waterproof connectors.

Any circuits inside the input/output device 106 that could generate electrical noise (e.g., microprocessors and memory) may be covered with a suitable electrical shielding material. Likewise, any components that may be exposed to electrostatic discharge (e.g., antennas and connectors) may be protected with transient suppression electronics. The components of the input/output device 106 are designed to operate while being exposed to extremes in outdoor temperatures and ultraviolet rays. For example, display devices are designed to be easily readable in direct sunlight and touch screen devices are designed to be rugged enough to survive in rough and outdoor environments.

The input/output device 106 may include any of a variety of standard input/output features, such as a display 202, a touch screen 204, a keypad 206, microphone, and speaker, etc. It may also include special input features that facilitate meter reading applications, such as antiglare surfaces, special keys, etc. In addition, a dedicated processor 208 may be provided that provides processing capabilities for the input/output features.

The input/output device 106 also includes a meter reading module 210, an optical probing interface 212, or both, for reading meters. Other meter reading modules may be included, depending on the type or types of meters to be read. Some devices may also include a GPS module 214 for facilitating route finding during meter reading applications.

Figure 4:
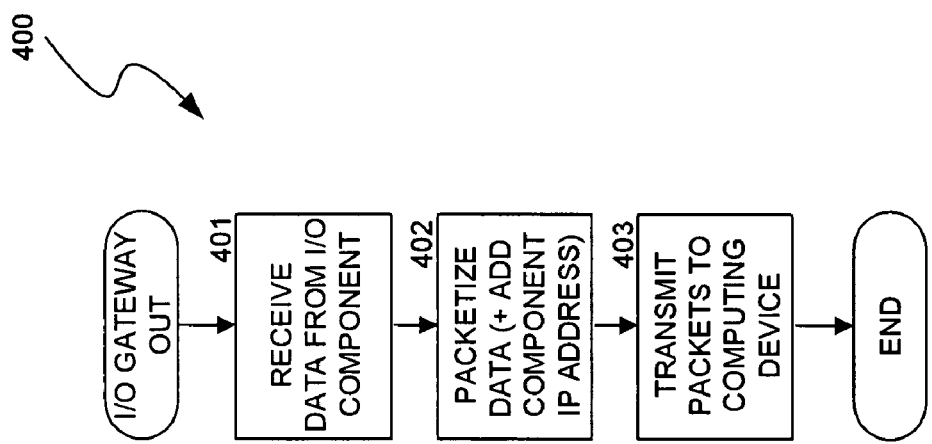
FIG. 4 is a flow diagram showing an example of a transmit output routine performed by the gateway component of FIG. 2.
Figure 5:
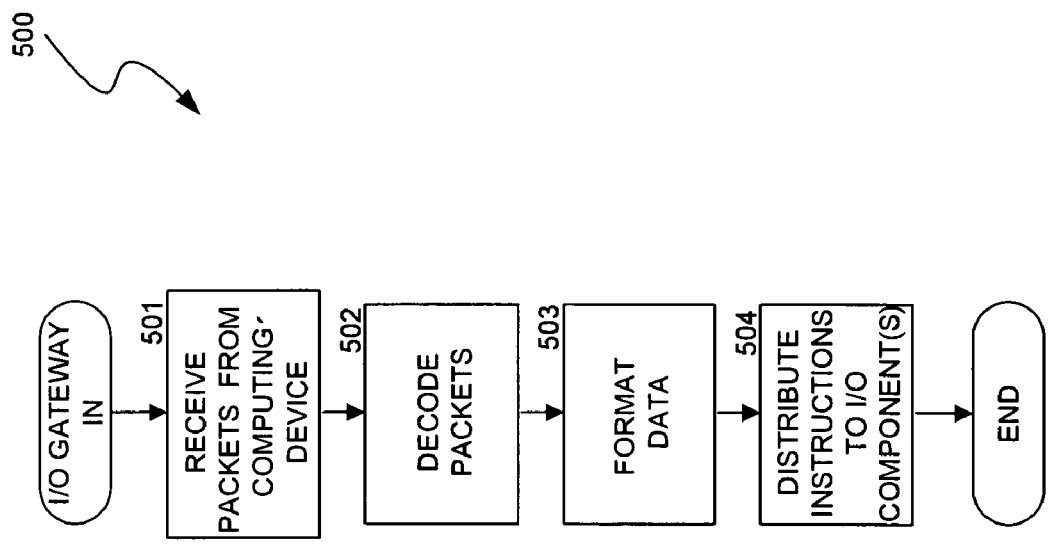
FIG. 5 is a flow diagram showing an example of a receive input routine performed by the gateway component of FIG. 2.

A wired or wireless gateway component 216 serves as an interface between the input/output device 106 and the computing device 108. For example, it may facilitate packetizing information from the various components of the input/output device 106 and transmitting such components via various wireless transmission schemes to the computing device 108. In some embodiments, each component of the input/output device 106 may have its own IP address to facilitate packetizing data to be sent to the computing device 108. In this way, packets can be sent in a serial packet stream 218 to the computing device 108. Likewise, data received from the computing device 108 may come in the form of an input stream 220 that the wireless gateway component 216 can disseminate to the various components of the input/output device 106. Examples of routines for output and input at the wireless gateway component 216 are shown in FIGS. 4 and 5, respectively.

In some embodiments, the display 202 of the input/output device 106 is protected with a thick polycarbonate window, and the keys are designed to be completely sealed against the elements, while providing tactile feedback to the operator, even through warm winter gloves. Inside the housing, the electronic components may be shock mounted to protect against severe drop stresses. The ergonomics of the input/output device 106 may be optimized for meter reading field applications (e.g., light weight and configured for one-hand operation).

Referring to FIGS. 2B–2C, various examples of specific modules that may comprise an input output/device (e.g., the input/output device 106 of FIGS. 1 and 2A) are shown. As shown in FIG. 2B, the various components of the input/output device may an application specific integrated circuit/field programmable gateway (ASIC/FPGA) component 248, an MSP430 component 250, a power supply regulator (e.g., 5/3 volt) 252, a transceiver board 254, and an and an RS232 USB Ethernet component 266. FIG. 2B shows another alternate configuration of an input/output device that includes many of the components of FIG. 2B, with a receiver board 270 in place of the transceiver board 254.

Referring to FIG. 3, the computing device 108 of FIG. 1 includes various features for communication with the input/output device 106. To protect it from noise, environmental contamination, and other interfering factors, the computing device 108 may be surrounded by an electromagnetically shielded and environmentally sealed case or housing 300. The case or housing 300 may be made of a strong metallic or plastic material to protect the internal device from sunlight, water, rain, wind, snow and ice, temperature extremes, electrostatic discharges, vibration, dust, dirt, drop stress, etc. The computing device 108 may also be mounted in a padded case, with thermal insulation to protect it from temperature extremes. The case or housing 300 may also include shock mounting techniques, such as soft plastic elastomers, springs, etc., to protect the device from drop stresses. Any exposed connections may be protected with electrostatic discharge suppression devices, and any items of the computing device that remain visibly exposed may be protected behind a rugged window. The case or housing 300 could also house additional items such as larger battery devices to allow the computing device 108 to operate for a longer period of time than the normal use for the device. Additionally, thermal management (heating or cooling) could be provided within the case or housing to provide a suitable environment for the computing device, irrespective of the external conditions.

The computing device 108 itself may be worn on a belt of the meter reader operator, on a shoulder strap, etc. The relationship between the computing device 108 and the input/output device 106 can be one-to-many or one-to-one, depending on the application. The computing device itself 108 contains one or more meter reading applications 302, a processor 306, a memory 308, data storage 310, and a gateway component 304 (although some or all of these separate blocks may be monolithically integrated). The processor 306 may be any logic processing unit, such as one or more central processing units (CPUs), digital signal processors (DSPs), application specific integrated circuits (ASIC), etc. The gateway component 304 at the computing device 108 may manage input 312 and output 314 streams to and from the input/output device 106. In some embodiments, the computing device 108 may incorporate wireless technologies such that digital data and voice communications can be provided, thereby eliminating the need for the operator to carry additional devices (e.g., mobile phone, PDA, etc.).

The computing device's operating system (not shown) may, in some embodiments, serve as a virtual operating system for the various components of the input/output device 106. To facilitate this process, each component in the input/output device 106 may have its own IP address that the gateway component 304 of the computing device 108 may recognize. To facilitate efficient communication between the computing device 108 and the input/output device 106, the link from the input/output device 106 to the computing device 108 is of sufficient bandwidth or capability to facilitate the consolidations of multiple IP streams.

Protocols used to communicate between the input/output device 106 and the computing device 108 may vary but may include protocols such as a transport layer IP base protocol. In using such protocols, the components of the input/output device 106 are virtually connected to the operating system operating on the computing device 108 as though they were physically housed in the computing device 108.

While the description and figures show a particular arrangement and distribution of components between the input/output device 106 and the computing device 108, other arrangements and distributions are possible. For example, processing and memory capabilities currently illustrated as being located in the computing device 108 may be alternatively located, at least partially, in the input/out device 106.

Unless described otherwise, the construction and operation of the various blocks shown in FIGS. 1, 2, and 3 are of conventional design. As a result, such blocks need not be described in further detail herein, as they will be readily understood by those skilled in the relevant art.

III. System Flows

Referring to FIGS. 4 and 5, flow diagrams show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, instead of a file, data may be transmitted through a message queue, over HTTP, etc.

FIG. 4 is a flow diagram showing a routine performed by the gateway component 216 of FIG. 2A to output data to the computing device 108 of FIG. 1. The routine 400 begins at block 401 where the routine 400 receives data from one or more of the input/output components of the input/output device 106. At block 402 the routine 400 packetizes the data received from the component of the input/output device 106. This may include adding an IP address that corresponds to the input/output component so that the gateway component at the computing device 108 will recognize the source of the packets. At block 403 the routine 400 transmits the packets to the computing device 108. This may be done in a serialized format, so that no packets are dropped. The routine 400 then ends.

Referring to FIG. 5, a routine 500 performed by the wireless gateway component 216 of FIG. 2A is shown. At block 501 the routine 500 receives packets from the computing device 108. At block 502, the routine 500 decodes the packets according to the protocol used. At block 503 the routine 500, possibly via the gateway component, formats the data so that it can be read by the one or more components of the input/output device 106. At block 504, the routine 500 distributes instructions to the appropriate input/output components. The routine then ends.

IV. Conclusion

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the network communication system described herein. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list. As used herein, the terms "connected," "coupled," or any variant thereof, means any connection or coupling, either direct or indirect, between two or more elements; the coupling of connection between the elements can be physical, logical, or a combination thereof.

The teachings of the invention provided herein can be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. While the above description details certain embodiments of the invention and describes the best mode contemplated, no matter how detailed the above appears in text, the invention can be practiced in many ways. Details of the system may vary considerably in their implementation details, while still being encompassed by the invention disclosed herein. As noted above, particular terminology used when describing certain features, or aspects of the invention, should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing this application to pursue such additional claim forms for other aspects of the invention.

We claim:

1. A distributed meter reading system for use with multiple endpoints forming at least a portion of a utility distribution infrastructure, wherein each of the multiple endpoints collects information associated with at least consumption of a utility or other resource, the system comprising:

a portable computing device including:
 a processor;
 an operating system executed by the processor;
 an application configured for managing utility consumption information collected by the multiple endpoints, wherein the application accesses capabilities of the processor and executes in association with the operating system; and a storage component for storing aspects of the managed information, wherein the storage component is coupled to the processor;

wherein the portable computing device does not communicate independently with the multiple endpoints;

a portable interface device configured to operate independently of the portable computing device, the interface device including:

an endpoint communication component configured to communicate with at least some of the multiple endpoints in a vicinity of the interface device; and at least one user interaction component; and a short-range wireless link for establishing communication between the portable computing device and the interface device, wherein the portable computing device and the interface device are coupled exclusively via the wireless link, and wherein the portable computing device and the portable interface device operate together as a meter reading unit.

2. The system of claim 1 wherein the wireless link comprises a Bluetooth link.

3. The system of claim 1 wherein the wireless link comprises an IEEE 802.11 wireless link.

4. At an interface device of a distributed meter reading system, a method for collecting information from endpoints of a utility distribution system, wherein each of the endpoints tracks the consumption of a utility or other resource, the method comprising:

receiving an instruction to collect information from one or more endpoints;

collecting the information from the one or more endpoints in accordance with the instruction, wherein the collecting includes communicating with the one or more endpoints, and wherein the collecting is performed via a portable interface device; and transmitting, via a communication link, the collected information to a portable computing device for processing, wherein the portable computing device does not communicate independently with the one or more endpoints, wherein the portable computing device and the interface device are coupled exclusively via the communication link, and wherein the interface device and the portable computing device otherwise operate a majority of their functions independently of each other.

5. The method of claim 4 wherein the instruction to collect information from the one or more endpoints is an instruction from a user.

6. The method of claim 4 wherein the collected information includes meter reading data.

7. The method of claim 4 wherein the collected information includes meter servicing data.

8. The method of claim 4 wherein the communication link is a wireless communication link.

9. The method of claim 4 wherein the communication link is a wired communication link.

10. The method of claim 4, further comprising performing at least initial processing of the collected information.

11. The method of claim 4 wherein the transmitting comprises packetizing the collected information, including adding an internet protocol address to each of the individual packets of the collected information so that the portable computing device can recognize the source of the packets upon receipt.

12. A method for gathering and using information from meters in a utility distribution system, wherein each of the meters tracks the consumption of a utility or other resource over time, the method comprising:

approaching one or more meters with a first portion of a distributed meter reading apparatus, wherein the first portion of the distributed meter reading apparatus is portable;

establishing communication between the first portion of the distributed meter reading apparatus and the one or more meters;

collecting data from the one or more meters using the first portion of the distributed meter reading apparatus;

establishing a communication between the first portion of the distributed meter reading apparatus and a second portion of the distributed meter reading apparatus, wherein the second portion of the distributed meter reading apparatus is portable, does not communicate independently with the one or more meters, and includes processing capabilities that allow for the management of collected data; and transferring the collected data to the second portion of a distributed meter reading apparatus, wherein the first portion of the distributed meter reading apparatus and the second portion of the distributed meter reading apparatus otherwise operate independently.

13. The method of claim 12 wherein the second portion of the distributed meter reading apparatus is housed in a protective, electrically shielded case to prevent leakage of electrical noise.

14. The method of claim 12 wherein the second portion of the distributed meter reading apparatus comprises a commercially available, off-the-shelf portable computer for most of the processing.

15. The method of claim 12 further comprising processing the collected information at the second portion of the distributed meter reading apparatus.

16. The method of claim 12 further comprising processing the collected information at the second portion of the distributed meter reading apparatus and transferring the processed information to a head end system associated with the utility distribution system.

17. A computer-readable medium containing a message for facilitating the collection of utility consumption data from one or more utility meters, the message configured for being sent from a first device to a second device, the message comprising:

first information identifying the first device, wherein the first device is capable of at least facilitating input and output with a user and communicating with the one or more utility meters and with the second device;

second information identifying the second device, wherein the second device includes an operating system and computing capabilities that allow for the processing of utility data collected from the one or more utility meters by the first device, wherein the second device is remote to the first device and together with the first device forms a distributed meter communication entity, and wherein the second device does not communicate independently with the one or more utility meters; and protocol data facilitating a connection between the first device and the operating system of the second device, wherein the protocol data includes data facilitating the transport of the message from the first device to the second device.

18. The computer-readable medium of claim 17 wherein the connection between the first device and the second device is through a local area network.

19. The computer-readable medium of claim 17 wherein the second information includes an internet protocol address.

20. The computer-readable medium of claim 17 further comprising utility consumption data.

21. A distributed meter reading system comprising:

at a portable first portion of a distributed apparatus:

means for receiving an instruction to collect information from one or more endpoints of a utility distribution system, wherein each of the one or more endpoints tracks the consumption of a utility or other resource;

means for collecting the information from the one or more endpoints in accordance with the instruction, wherein the collecting includes communicating with the one or more endpoints; and means for communicating with a portable second portion of the distributed apparatus, wherein the first portion and the second portion operate together as a unit; and at the second portion of the distributed apparatus:

means for communicating with the first portion of the distributed apparatus via a communication link between the first portion of the distributed apparatus and the second portion of the distributed apparatus;

means for receiving information collected by the first portion of the distributed apparatus; and means for processing the received information, wherein the second portion does not communicate independently with the one or more endpoints.

22. The system of claim 21 wherein an application running on the second portion of the distributed apparatus can interact with the first portion of the distributed apparatus device as if the first portion of the distributed apparatus is at least partially controlling the application or operating system.

23. The system of claim 21 wherein the second portion of the distributed apparatus further comprises means for transferring data.

* * * * *

UNITED STATES PATENT AND TRADEMARK OFFICE
CERTIFICATE OF CORRECTION

PATENT NO. : 7,209,049 B2 Page 1 of 1
APPLICATION NO. : 11/063648
DATED : April 24, 2007
INVENTOR(S) : Dusenberry et al.

It is certified that error appears in the above-identified patent and that said Letters Patent is hereby corrected as shown below:

In column 5, line 63, before "RS232" delete "and an".

Signed and Sealed this

Twenty-fourth Day of June, 2008

JON W. DUDAS
*Director of the United States Patent and Trademark Office*